May 25, 1937.  L. B. HILL  2,081,299
APPARATUS FOR TAKING AND DISTORTING MOVING PICTURES
Filed Nov. 5, 1934    2 Sheets-Sheet 1
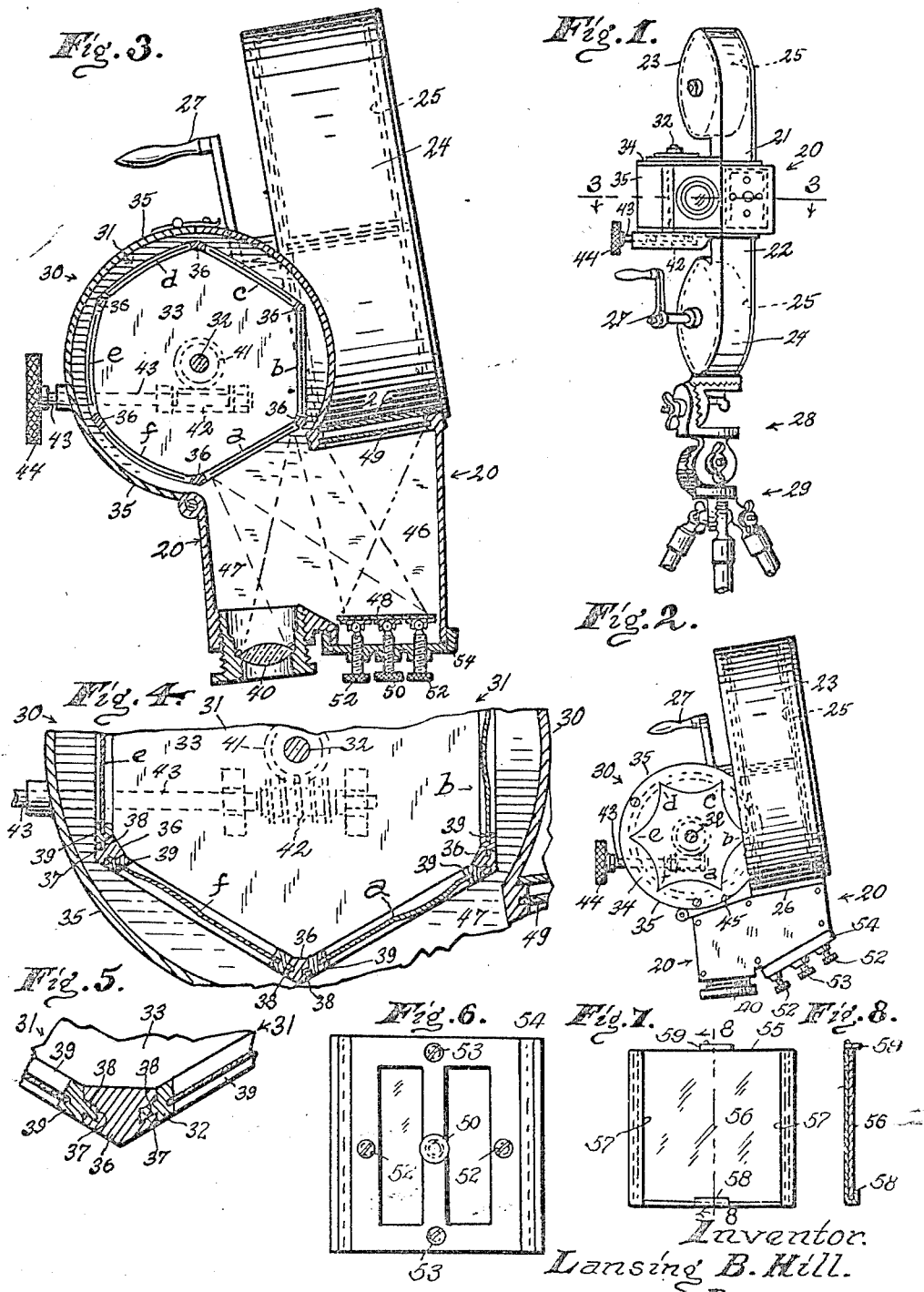
Inventor.
Lansing B. Hill.
By William M. Gentle
His Attorney.

May 25, 1937.  L. B. HILL  2,081,299
APPARATUS FOR TAKING AND DISTORTING MOVING PICTURES
Filed Nov. 5, 1934  2 Sheets-Sheet 2
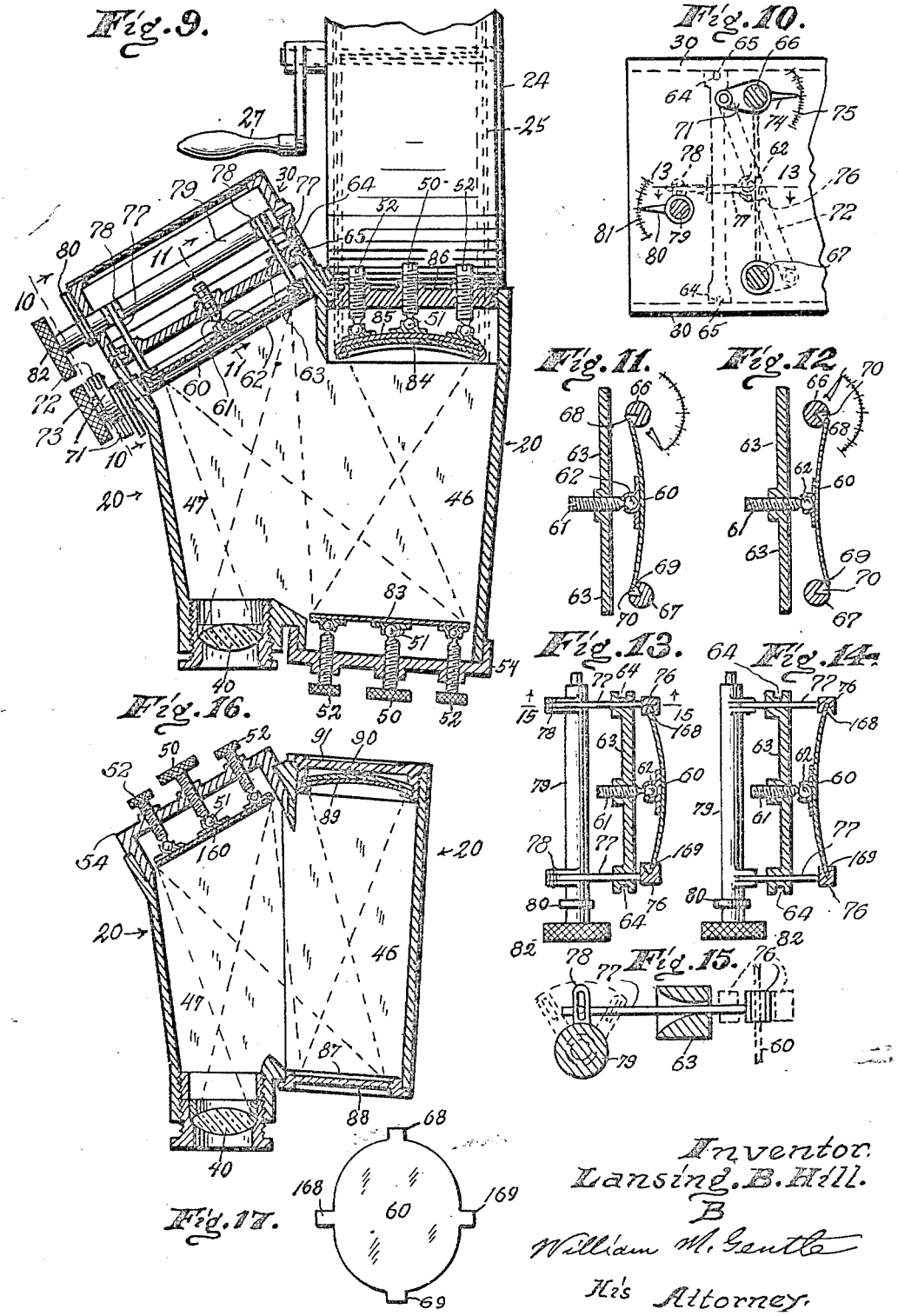
Inventor.
Lansing. B. Hill.
B
William M. Gentle
His Attorney.

Patented May 25, 1937

2,081,299

UNITED STATES PATENT OFFICE 2,081,299

APPARATUS FOR TAKING AND DISTORTING MOVING PICTURES

Lansing B. Hill, Santa Ana, Calif.

Application November 5, 1934, Serial No. 751,666

5 Claims. (Cl. 88—16)

This invention is an improvement on my prior application for United States Letters Patent on a camera, filed August 18, 1934, Sr. No. 740,471, and the principal object thereof is to provide a photographic apparatus that can be utilized in producing comic moving pictures as well as for ordinary picture-taking.

To that end I provide a photographic apparatus for taking and distorting moving pictures that is constructed to humorously distort the images with means connected thereto for increasing and decreasing the distortions while the camera is in operation. That is, by manipulating a flexible mirror the distortions of the images can be increased or decreased as may be desired by the operator as exposures are made on a moving film.

Another object of this invention is to construct the apparatus so that there is a double reflecting means interposed between the lens and film so that the picture will be reversed on the film and be right when the picture is printed.

A feature of invention is shown in connecting the back portion of a flexible mirror by a ball and socket joint with an end of a supporting screw that can be adjusted to move and hold the center portion of the mirror in focus with a lens and film, with means for bending the ends and side portions of the mirror more or less to distort an image.

A feature of invention is shown in making the reflector or mirror frames removable from the apparatus so the mirrors can be easily and quickly removed and replaced by other mirrors for the purpose of giving a much greater range in distorting moving pictures.

Other objects, advantages and features of invention may appear from the accompanying drawings and the detailed description thereof.

The accompanying drawings illustrate my invention, in which:

Figure 1 is a semi-diagrammatic perspective view of a photographic apparatus that is constructed in accordance with this invention showing the lower parts of the stand legs broken away.

Fig. 2 is a plan view of the apparatus shown in Fig. 1.

Fig. 3 is an enlarged cross section as taken on line 3—3 of Fig. 1, with many of the parts shown diagrammatically and other parts indicated by dotted lines.

Fig. 4 is a fragmental enlarged section analogous to the center portion of Fig. 3, showing removable mirror frames with mirrors therein, each having a half portion straight and the other half bent to distort the image.

Fig. 5 is a greatly enlarged sectional view analogous to the lower portion of the revolving mirror carrier shown in Fig. 4, showing the tongue and groove connections between the posts and frames so the frames can be removed and replaced and other frames inserted in their place.

Fig. 6 is a rear view of a modified form of mirror frame detached from the camera, showing the adjusting screws for supporting and bending a flexible mirror.

Fig. 7 is a front view of a slightly modified form of mirror holder for use with the revolving carrier.

Fig. 8 is a central vertical section as taken on line 8—8 of Fig. 7.

Fig. 9 is an enlarged fragmental section similar to the lower portion of Fig. 3, showing a modified form of photographic apparatus for taking and distorting moving pictures that is constructed so it can be operated to cause consecutive distortion of moving pictures in a way slightly different from the apparatus shown in Figs. 1 to 3.

Fig. 10 is a fragmental section as taken on line 10—10 of Fig. 9, showing in more detail the means for actuating a flexible mirror with scales on a side of the frame for indicating the extent to which the mirror is bent inwardly from its sides and edges.

Fig. 11 is a fragmental section as taken on line 11—11 of Fig. 9 showing a flexible mirror supported on a center adjusting screw arranged to hold the center portion of the mirror in a prearranged position, and also showing the top and bottom edge portion of the flexible mirror bent to present a convex face.

Fig. 12 is a view analogous to Fig. 11, with the mirror curved or bent reversely from that shown in Fig. 11, also showing that the center supporting screw holds the center portion of the mirror in a relatively fixed position when the sides and end portions are bent into distorting positions.

Fig. 13 is a fragmental cross section as taken on line 13—13 of Fig. 10, showing the side edges of the flexible mirror bent to present a convex face.

Fig. 14 is a view analogous to Fig. 13 with the mirror curved or bent reversely from that shown in Fig. 13.

Fig. 15 is an enlarged section as taken on line 15—15 of Fig. 13.

Fig. 16 is a central longitudinal section through a modified form of photographic apparatus.

Fig. 17 is a diagrammatic view of a flexible mirror showing side and end extensions.

My improved photographic apparatus for taking and distorting moving pictures includes a casing 20 to which the extensions 21 and 22 of the upper and lower drums 23 and 24 are connected.

Reels 25, shown by dotted lines, are arranged in the drums so that a film can be run from the upper reel down through the film gate 26 to the reel in the lower drum that is adapted to be actuated by a crank 27. The construction and operation of the reels are well known and for that reason are not shown or described in detail.

The lower drum is mounted on an adjustable support 28 on a tripod stand 29 arranged to aid in supporting and focusing the apparatus, and as these parts are also old they are not shown or described in detail.

The casing 20 is provided with a rearward extension 30 that is cylindrical and has a carrier 31 therein that is mounted on a shaft 32 that extends centrally and vertically up through the floor 33 and removable lid 34; and there is a door 35 to the extension through which the interior can be reached.

The carrier 31 is six-sided and has corner posts 36 having oppositely arranged slots 37 adapted to receive the beads 38 on the sides of the mirror frames 39 so the latter can be removed and replaced with like frames and removed for repair. This carrier 31 is mounted on the shaft 32 so it can be revolved to move its mirrors $a$, $b$, $c$, $d$, $e$ and $f$ into focus with the lens 40 when so desired.

The shaft 32 has a worm gear 41 on its lower end that is in mesh with a worm 42 on the counter shaft 43 that can be revolved in either direction by a knurled nut 44.

A star-shaped indicator is secured on the upper end of the shaft 32 so its six arms are arranged centrally relative to the sides of the carrier and mirrors therein; and the arms are marked with the letters $a$, $b$, $c$, $d$, $e$ and $f$ to correspond with the mirrors of the carrier.

The pointer arms are arranged to be moved into register with a stationary pointer 45 in the casing 20 so that the operator will know what mirror of the carrier is in focus with the lens 40, and also so he can move any of the mirrors into focus as he may desire.

The casing 20 is provided with a chamber 46 that is offset from the lens chamber 47 and has a mirror 48 therein arranged to receive an image from a mirror on the carrier 31 and reflect the image so received to a film 49 as it passes through the film gate 26. That is, an image from the lens, 40 is first projected to a mirror on the carrier, then from this mirror the image is again reflected to the mirror 48 and then reflected to the film 49 as described.

The flexible mirror 48 is supported at its back center on the inner end of a center screw 50 by a ball joint 51; and the screw is adjustable so it can be moved to adjust the center portion of the mirror toward or from the film 49 in the film gate 26 to obtain a proper focus.

Also connected to the back side edges of the mirror 48 by ball and socket joints, are the adjusting screws 52 for bending the sides to form either convex or concave reflecting surfaces for distorting the image from the lens 40 before it is reflected to the film 49; and also as best shown in Fig. 6 there are upper and lower adjusting screws 53 for bending the upper and lower edge portions of the mirror 48 to form other convex and concave surfaces for distorting the image, as previously stated. The screws 53 are connected to the back of the mirror 48 in substantially the same way as are the screws 52.

The screws 50, 52 and 53 are adjustably extended through a cover plate 54 that normally closes an opening into the chamber 46.

A modified form of mirror frame is shown in Figs. 7 and 8, and as seen therein the frame 55 has an open top so that a mirror 56 can be passed downward in the side grooves 57 until its bottom edge rests on the channel 58; and a clip 59 is provided at the top for holding the mirror in place, and parts in these figures are indicated semi-diagrammatically.

A modified form of moving picture camera is shown in Figs. 9 to 15, and as seen therein the extension 30 is rectangular instead of cylindrical, and instead of the extension having a revolving mirror carrier it is provided with a single flexible mirror 60. This mirror 60 is adjustably supported by a screw 61 that has one end connected centrally and to the back of the mirror by a ball joint 62 and the other end of the screw is adjustably extended through a plate 63 that is slidably mounted between the wall of the extension 30. That is, the ends of the plate are provided with slots 64 into which the beads 65 of the walls of the extension are extended.

Slotted shafts 66 and 67 are arranged above and below the mirror 60 so that its upper and lower extending portions 68 and 69 are extended into the V-shaped slots 70 so that when the shafts are reversely and slightly rotated in one direction or the other the flexible mirror will be bent to form either a convex or concave reflecting surface.

The shafts are provided with crank arms 71 that are connected by a cross link 72 so they move together; and the upper shaft 66 is provided with a knurled nut 73 for actuating it.

The shaft 66 carries a pointer 74 that is arranged over a scale 75 on the outside wall of the extension 30 so that an operator can see to what extent he is curving the flexible mirror.

The flexible mirror 60 also has oppositely arranged slotted clips 76 that engage the side edges of extensions 168 and 169; and these clips are secured on the forward ends of the rods 77 that are extended through the plate 63 and have their other ends pivotally connected to the arms 78 on the shaft 79 mounted in the extension 30.

A pointer 80 is secured to the shaft 79 so it moves over a scale 81 on a side of the extension to thereby indicate to the operator the extent to which he is bending the side portions of the mirror 60 to form either convex or concave reflecting surfaces to distort the image from the lens 40; and a knurled nut 82 is secured to one end of the shaft 79 so it can be actuated to bend the flexible mirror to form either a convex or concave reflecting surface.

By the foregoing construction the mirror 60 can be gradually bent to distort the image from the lens 40, or, if desired, the mirror can be suddenly bent to such a degree as to greatly distort the image.

The flexible distorting mirror 60 is arranged to reflect an image from the lens 40 to another flexible distorting mirror 83 which, in turn, reflects the image to a moving picture film 84 that is arranged to pass from the upper to the lower drum through the adjustable curved film gate 85 that is supported in a frame 86 so the image receives consecutive distortions from the flexible mirrors 60 and 83 when projected from the lens 40 to the film passing through the gate 85, see Fig. 9.

If desired, the body of the flexible mirror 60 can be semi-elliptical, as shown by full lines as illustrated in Fig. 17.

In the modified form of camera shown in Fig. 16, the lens 40 is arranged to first reflect an image to the adjustable flexible distorting mirror 160 which in turn reflects the image to a mirror 87 in a removable holder 88 that is arranged to again reflect the image to a film 89 in a curved film holder 90 that is removably mounted in the frame 91 in the rear end of the chamber 46.

It is obvious that an image reflected from the lens 40 can be humorously distorted by any of the distorting mirrors, and two or more of the distorting mirrors can be actuated together to cause a compound distortion of the image and the distortions can be made either suddenly or gradually to thereby produce startling as well as humorous effects.

The camera and its modifications are operated as hereinbefore fully described.

I claim as my invention:

1. A photographic apparatus for use in taking and distorting moving pictures including a casing, a lens in said casing, a film gate in said casing, means for passing a moving picture film through said gate, two flexible mirrors in said casing for consecutively reflecting an image from said lens to a film passing through said gate, adjustable center screws for supporting said mirrors and holding their center portions stationary, other adjustable screws for bending the ends and side portions of said mirrors to distort an image from said lens, said mirrors arranged to reflect the distorted image to a moving picture film passing through said gate, and means for passing a moving picture film through said gate.

2. A photographic apparatus for use in taking and distorting moving pictures including a casing, a lens in said casing, a film gate in said casing that is offset relative to said lens, means for passing a moving picture film down through said gate, two flexible mirrors in said casing for consecutively reflecting an image from said lens to a film passing through said gate, center screws for supporting said mirrors and holding their center portions stationary while their side and end portions are being bent, other adjustable screws for bending the ends and side portions of said mirrors to distort the image from said lens, and ball and socket joints for connecting said screws to the back of said mirrors substantially as described.

3. A photographic apparatus including a casing, a lens therein, a flexible mirror, a center screw in said casing having an end pivotally connected to the center back portion of said mirror, said screw being adjustable to move the center portion of said mirror toward or from said lens, another mirror offset from said lens that is arranged to receive reflections from said flexible mirror, a film gate arranged so a film therein will receive reflections from said other mirror, means for bending the ends and sides of said flexible mirror to distort an image from said lens, and other means for passing a moving picture film through said gate so an image from said lens, after being distorted by said flexible mirror, will be reflected by said other mirror to the film in said gate.

4. A photographic apparatus for taking moving pictures including a casing, a lens therein, a pair of rollers having V-shaped slots therein arranged oppositely to one another, a center supporting and adjusting screw in said casing, a flexible mirror having its upper and lower ends extending loosely into the slots in said rollers, a ball and socket joint connecting said screw with the center back portion of said mirror arranged to hold the center portion of the mirror stationary when its end portions are bent by a partial rotation of said rollers to distort an image, another mirror, a film gate, said mirrors and gate arranged so an image from said lens can be reflected to a moving picture film passing through said gate and means for actuating said rollers for the purpose specified.

5. A photographic apparatus for taking moving pictures including a casing, a lens therein, a pair of rollers having V-shaped slots arranged opposite to one another, a center supporting and adjusting screw in said casing, a flexible mirror having its ends extended loosely into the slots in said rollers, a ball and socket joint connecting said screw with the center portion of said mirror arranged to adjust the mirror and hold its center portion stationary when its ends and side portions are being bent, another roller in said casing, a connection between said other roller and the side edges of said mirror whereby said rollers can be actuated to bend the ends and side portions of said mirror to distort an image, another mirror, a film gate, said mirrors and gate arranged so an image from said lens can be distorted and reflected to a moving picture film passing through said gate.

LANSING B. HILL.